US005453301A

United States Patent [19]

Saatweber et al.

[11] Patent Number: 5,453,301

[45] Date of Patent: Sep. 26, 1995

[54] PROCESS FOR RECOVERING THE OVERSPRAY OF AQUEOUS COATING AGENTS DURING SPRAY APPLICATION IN SPRAY BOOTHS

[75] Inventors: Dietrich Saatweber, Wuppertal; Waltraud Krumm, Schwelm; Bernhard Richter, Wuppertal; Dirk Holfter, Hagen, all of Germany

[73] Assignee: Herberts Gesellschaft mit Beschrankter Haftung, Wuppertal, Germany

[21] Appl. No.: 331,264

[22] Filed: Oct. 28, 1994

Related U.S. Application Data

[63] Continuation of Ser. No. 52,399, Apr. 23, 1993, abandoned.

[30] Foreign Application Priority Data

Apr. 25, 1992 [DE] Germany .......................... 42 13 671.7

[51] Int. Cl.$^{6}$ .......................... B05D 1/02

[52] U.S. Cl. .......................... 427/421; 427/345; 118/326; 118/688; 118/689

[58] Field of Search .......................... 427/345, 421; 118/326, 688, 689

[56] References Cited

U.S. PATENT DOCUMENTS

| | | | |
|---|---|---|---|
| 4,607,592 | 8/1986 | Richter | 118/689 |
| 4,818,388 | 4/1989 | Morioka et al. | 210/167 |
| 5,019,093 | 2/1992 | Herwig et al. | 210/639 |

FOREIGN PATENT DOCUMENTS

| | | |
|---|---|---|
| 2079693 | 4/1993 | Canada . |
| 247563 | of 0000 | European Pat. Off. . |
| 224158 | of 0000 | European Pat. Off. . |
| 227454 | of 0000 | European Pat. Off. . |
| 231442 | of 0000 | European Pat. Off. . |
| 4022222 | of 0000 | Germany . |
| 2945523 | of 0000 | Germany . |
| 2809715 | of 0000 | Germany . |
| 2353469 | 4/1975 | Germany . |
| 2510309 | 9/1976 | Germany . |
| 3319013 | 11/1984 | Germany . |
| 3332457 | 5/1985 | Germany . |
| 3428300 | 2/1986 | Germany . |
| 61-10782 | of 0000 | Japan . |
| 59-189969 | of 0000 | Japan . |
| 1129073 | 5/1989 | Japan . |
| 2063096 | 6/1981 | United Kingdom . |

*Primary Examiner*—Shrive Beck

*Assistant Examiner*—David M. Maiorana

*Attorney, Agent, or Firm*—Merchant, Gould, Smith, Edell, Welter & Schmidt

[57] ABSTRACT

Continuous process for recovering the overspray of aqueous coating agents during spray application by collecting it in an aqueous washing liquid which is continuously circulated in a circuit (A) to the spray booth, where the solids concentration of said washing liquid is maintained within the range of 1–1.5 wt.-%, whereby a part of the washing liquid containing overspray is fed to a first ultrafiltration circuit (B) in which the solids concentration of the circulating liquid is maintained within a range of 8–15 wt.-%, a part of the circulating liquid from ultrafiltration circuit (B) being fed to a further ultrafiltration circuit (C) in which the solids concentration of the circulating liquid is maintained approximately constant within a range between 35 wt.-% and the solids concentration corresponding to spray viscosity of the aqueous coating agent, whereas the permeate from circuits (B) and (C) is returned to circuit (A) in order to top up the washing liquid and at least a part of the liquid circulating in ultrafiltration circuit (C) is used as an aqueous coating agent for spray application in the spray booth or for preparation thereof.

10 Claims, 1 Drawing Sheet

PROCESS FOR RECOVERING THE OVERSPRAY OF AQUEOUS COATING AGENTS DURING SPRAY APPLICATION IN SPRAY BOOTHS

This is a continuation, of application Ser. No. 08/052,399, filed Apr. 23, 1993, now abandoned.

BACKGROUND OF THE INVENTION

The invention relates to a process for recovering the overspray of aqueous coating agents during spray application in spray booths, whereby the overspray can be recycled to the aqueous coating agent used in the spray booth.

For known reasons of environmental protection it is becoming ever more important to substitute water-dilutable systems for lacquers diluted with organic solvents. By using waterdilutable systems, pollution of the air by solvent emissions is reduced or entirely eliminated. However, problems arising during the disposal of the overspray (lacquer mist) constitute a general weakness when processing coating agents such as water-dilutable lacquers by spray application; these problems are particularly frequent with large-scale production lacquering as in the automobile industry.

It is known how to clean the exhaust air from spray booths in order to dispose of the overspray by washing with water. DE-A1-29 45 523, for instance, describes a process in which the overspray of conventional solvent-dilutable lacquers is washed with water, whereupon the washing water is subjected to ultrafiltration.

DE-A1-32 27 227 describes a similar system for disposing of the overspray produced when lacquering with aqueous lacquers. The overspray is absorbed on spray booth walls sprinkled with water and the circulated sprinkling water is processed by passing it through an ultrafilter. However, the overspray collected in the sprinkling water has proved not to be suitable for further use in coating agents and must therefore be disposed of. Although ultrafiltration is used when purifying effluent and in particular when removing undesirable low-molecular substances in the course of electrophoretic lacquering processes, thus improving the degree of utility by recycling (DE-C2-21 58 668, DE-B2-22 29 677, EP-A1-0 127 685, EP-A1-0 137 877, U.S. Pat. Nos. 3,663,405 and 3,663,406), the use of ultra-filtration entails problems as regards the recycling of overspray. For whereas ultra-filtration of electrophoretic lacquers enables the return of the permeate and the retentate into the bath material, the different method of application (spraying instead of electro-dipping) and the larger differences in viscosity caused thereby gives rise to stability problems such as possible coagulation, sedimentation, phase separation and precipitation, when recycling the overspray of aqueous lacquers. DE-A1-34 28 300 recommends, with a view to avoiding the stability problems associated with the process as described in DE-A1 32 27 227, sprinkling of the spray booth with desalinated water. However, it has proved that even if desalinated water is used by way of sprinkling liquid it is not possible to overcome the stability problems associated with the overspray absorbed so as to make it suitable for re-use as part of the lacquering material. WO 91/09666 attempts to solve the stability problems associated with the process according to DE-A1-32 27 227 by sprinkling the spray booth with water to which an anti-coalescent agent has been added. By way of such agents use may be made of amines. This means that on the one hand environmentally harmful substances are added while on the other hand the composition of the lacquer is modified the addition of chemicals.

Moreover, raising the concentration of the overspray in water by ultrafiltration from low to higher values gives rise to considerable changes in the aqueous coating agent inasmuch as due to the ultrafiltration certain constituents, in particular water-soluble and low-molecular constituents such as solvents and neutralisation agents, are removed which significantly contribute to the stabilisation of the aqueous lacquer dispersions and their technical lacquer properties. In "Die Naβ Blackierung ohne Emissionen oder Sondermüll in oberfläche+JOT 1991, issue 3, pages 18 to 20, Dirk Saarbach and Georg Schlumpf describe the lacquering of office furniture subject to aqueous-lacquer recycling, specifying also a process of continuous circulation. It is mentioned that the partial systems "water-dilutable stoving lacquer", "ultrafiltration apparatus" and "spraying system" must be in tune with one another. The introduction of additives into the recycling process is also described. However, there is no indication of how to operate the system without incurring stability problems; furthermore, the introduction of additives causes the composition of the original lacquer to be modified.

Only lacquers which do not coagulate or develop other instability phenomena which modify technical lacquer properties when the concentration is raised by ultrafiltration from low to high values are suitable for this process.

SUMMARY OF THE INVENTION

The present invention is therefore intended to provide a process for recovering the overspray of aqueous coating agents, enabling re-use of the overspray in the aqueous coating agent and avoiding stability problems while at the same time enabling the use of aqueous coating agents which are of high quality and, in consequence, generally sensitive, such as aqueous automobile lacquers, on a practical scale.

It has proved that this problem can be solved by a process for recovering the overspray of aqueous coating agents during spray application in spray booths, in which the overspray is collected in an aqueous washing liquid continuously returned to the spray booth in a circuit A, whereby a part of the washing liquid containing overspray is supplied from circuit A to an ultrafiltration circuit B and whereby permeate is drawn off in ultrafiltration circuit B and returned to circuit A in order to supplement the washing liquid, said process being characterised in that it is carried out continuously, in that the solids concentration of the washing liquid in circuit (A) is maintained approximately constant within a range of 1–1.5 wt.-%, in that by drawing off permeate the solids concentration of the liquid circulating in ultrafiltration circuit (B) is maintained approximately constant within a range from 8–15 wt.-%, whereby a part of the circulating liquid is fed from ultrafiltration circuit (B) to a further ultrafiltration circuit (C) in which, by drawing off permeate the solids concentration of the circulating liquid is maintained approximately constant within a range from 35 wt.-% to the solids concentration corresponding to spray viscosity of the aqueous coating agent, the permeate from circuit (C) being also returned to circuit (A) in order to supplement the washing liquid and at least a part of the liquid circulating in ultrafiltration circuit (C) being used as an aqueous coating agent for spray application in the spray booth or for preparing said coating agent.

With the process according to the invention water, e.g. desalinated water, may initially be used by way of washing liquid in circuit A, whereby said water may contain the usual amounts of defoamer. Use may also be made of permeate or the aqueous coating agent used for spray application, which has been diluted to the required solids concentration with desalinated water. In the course of the process the washing liquid is replaced or partly replaced by the ultrafiltrate (permeate) from ultrafiltration circuits B and C. If the permeates from circuits B and C are not sufficient it is possible to use desalinated water or diluted coating agent in order to supplement the liquid.

With the process according to the invention recycling proceeds continuously in several circuits. In circuit A, the booth circulation system, the washing liquid takes up overspray and is continuously fed to circuit B, an ultrafiltration circuit. At the same time circuit A continuously takes up aqueous permeate from circuits B and C. Due to the ratio between the amount of overspray picked up and the amount delivered to circuit B, the solids concentration in circuit A can be maintained approximately constant at a value between 1 and 1.5 wt.-% and preferably 1.5 wt.-%.

In ultrafiltration circuit B the washing liquid enriched with overspray is subjected to ultrafiltration, whereby on the one hand aqueous permeate is returned to circuit A and on the other hand the overspray, the concentration of which has been raised within ultrafiltration circuit B is supplied to a further ultrafiltration circuit C. In circuit B the concentration of the solids contained in the washing liquid enriched with overspray is raised to between 8 and 15 wt.-% and preferably about 10 wt.-%; the liquid in circuit B is preferably maintained at a constant value within this range. The permeate from circuit B, the solids concentration of which may be within a range up to 1 wt.-%, is returned with a view to topping up the washing liquid in circuit A.

The retentate retained in circuit B is fed to a further ultrafiltration circuit C. For instance, a partial amount is taken from circuit B, said amount corresponding to the amount of washing liquid supplied from circuit A, which has been enriched with overspray.

In ultrafiltration circuit C the retentate drawn off from circuit B is subjected to further ultrafiltration. The procedure is such as to maintain the solids concentration of the liquid circulating in ultrafiltration circuit C between approximately 35 wt.-% and the solids concentration corresponding to spray viscosity of the coating agent used. The solids concentration in circuit C is preferably maintained between no less than 40 and 45 wt.-%. The solids concentration in circuit C is preferably maintained at a constant value.

The aqueous permeate obtained in circuit C can again be fed to circuit A. It may, for instance, have a solids concentration up to approximately 1 wt.-%.

Each of the percentages by weight indicated above in respect of circuit A, circuit B and circuit C relate to the total weight of the aqueous system within the circuit.

The liquid circulating in ultrafiltration circuit C is either the aqueous coating agent used for spray application in its sprayable state or in a water-diluted form. Hence the liquid circulating in ultrafiltration circuit C can be supplied to the spraying devices in the spray booth either directly or after processing. According to a preferred embodiment, a part of the liquid circulating in ultrafiltration circuit C may, with a view to processing, be mixed with fresh topping-up concentrate of the aqueous coating agent and optionally with water and/or optionally other coating agent constituents. Mixing can optionally be effected in a special mixer. According to another preferred embodiment the topping-up concentrate and optionally water and/or optionally other coating agent constituents may optionally be added by a mixer and at an appropriate rate to the liquid circulating in ultrafiltration circuit C, thus making it possible to supply the spraying devices directly with the liquid circulating in ultrafiltration circuit C. The topping-up concentrate for the aqueous coating agent is mixed with circuit liquid C to spray viscosity and passed on for spray application. With the process according to the invention, harmonisation of circuits A, B and C eliminates stability problems such as were associated with the state of the art. The process according to the invention enables therefore direct re-use of the overspray of aqueous coating agents even if the latter tend to become unstable when their concentration is raised by ultrafiltration or their technical lacquer properties (e.g. their viscosity) are modified, as is particularly the case with high-quality lacquers for production lacquering of automobiles.

The process according to the invention largely avoids the need for an additional amount of mains water or fully desalinated water for sprinkling the spray booth walls such as was necessary with the state of the art and led to stability problems in respect of the overspray recovered. For optimal take-up of the overspray the walls of the booth are sprinkled with diluted aqueous coating agent in the form of permeate. Only water removed in the course of the process, for instance as a result of evaporation, is replaced with desalinated water.

The process according to the invention has the advantage of maintaining the composition and equilibrium in the circuits, so that undesirable changes in the composition of the aqueous coating agent are avoided. This prevents disturbance factors causing instability and enables virtually 100% recycling of overspray without high expenditure on corrective action and with low expenditure on analysis.

Contrary to the known processes it is possible to operate the recycling circuits virtually without introducing any additives into them. This ensures that the characteristics of the aqueous coating agent cannot be modified and possibly impaired by subsequent introduction of additives. All necessary additives, such as defoamers, additives preventing surface imperfections and levelling additives may e.g. be mixed with the lacquer topping-up concentrate. Two-stage ultrafiltration in circuits B and C offers, by comparison with one-stage ultrafiltration in a single circuit B the advantage that the solids concentrations in the washing liquid in booth circuit A can be low, as a result of which the amounts of solids removed from spray booth A can be further reduced during the essential stage of separating the air in the booth from the circulating liquid.

The equilibria can be adjusted simply using conventional apparatus. This adjustment may for instance be controlled through the ratio between the amount delivered and the amount taken up in each circuit, the area and capacity of the ultrafiltration membranes, the concentration of the topping-up concentrate for aqueous coating agents and the throughput of aqueous coating agent in the spray booth. One skilled in the art will readily determine such parameters by testing and calculation.

The process according to the invention can be carried out with conventional apparatus and there is therefore no need for any special modification of existing equipment.

The spray booths to be used in accordance with the invention are conventional spray booths. They can be operated with conventional circuits for incoming and exhaust air. The spray booths which can be used may for instance be equipped with at least one wet wall subject to sprinkling or with a Venturi washing system as used in particular in the sphere of motor vehicle lacquering. If wet walls subject to sprinkling are provided it is also possible for all walls to be wet walls subject to sprinkling. With wet walls subject to sprinkling the washing liquid serves as sprinkling liquid. The washing liquid may for instance be collected at the bottom of the spray booth and recycled for further sprinkling of the wet walls subject to sprinkling or for further Venturi washing. Those skilled in the art are familiar with such spray booths. They comprise the booth circuit, i.e. circuit A.

In circuit B and circuit C use is made of conventional ultrafiltration units. The aqueous liquid in circuits B and C is circulated through the ultrafiltration unit, e.g. via a container for the ultrafiltration retentate (which in this document is also referred to as concentrate), whereby it may be possible to heat or cool said container. From this container the ultrafiltration retentate is returned to the ultrafiltration unit. Upstream of the ultrafiltration unit a preliminary filter may be provided with a view to removing relatively coarse impurities. Overspray-enriched aqueous washing liquid derived from circuit A is fed to circuit B, e.g. into the container for ultrafiltration concentrate. In the same way circulation liquid derived from circuit B can be fed to circuit C, which may also be provided with a container for ultrafiltration concentrate as described with regard to circuit B. The aqueous permeate from circuits B and C can be returned from the filtration units directly to circuit A, e.g. to the bottom of the spray booth, which may take the form of a tub. Optionally all or part of the aqueous permeate can be passed through a hyperfiltration unit. In the hyperfiltration unit reverse osmosis takes place, as a result of which low-molecular constituents are drawn off from the aqueous permeate. Said constituents can be returned to circuit B or circuit C, e.g. to the container for ultra-filtration concentrate. The water discharged from the hyperfiltration unit is again returned to circuit A, e.g. to the bottom of the spray booth.

One skilled in the art will be familiar with ultrafiltration, reverse osmosis and hyperfiltration. They can be carried out with the aid of conventional units. These filtering processes are described both in the patent applications and patent specifications listed in the introduction to the present specification and e.g. in "Grundoperationen chemischer Verfahrenstechnik", Verlag Chemie, 1982, pp. 153–155, by Wilhelm R.A. Auck and Herrmann A. Müller, in "Grundlagen der chemischen Technik, Membrantrennverfahren, Ultrafiltration und Umkehrosmose", Otto Salle Verlag and Verlag Sauerläander, 1981, by Robert Rautenbach and Rainer Albrecht, and in "Membrane Filtration", Springer Verlag, 1983, by Thomas D. Brock.

With the process according to the invention, high pressures are not required for ultrafiltration. By way of minimum pressure the pressure has to be such as to cause the water and low-molecular substance to be pressed through the membrane at a measurable rate. Such pressures range e.g. between 0.7 and 11 bar and are preferably around 5 bar.

The pressure for reverse osmosis is by definition higher than the osmotic pressure. There is no sharply defined boundary between ultrafiltration and reverse osmosis or hyper-filtration. As regards the process according to the invention, reverse osmosis or hyperfiltration signifies, for example, filtration by which the low-molecular constituents of the permeate are, as far as possible, separated from water.

The fact that with the process according to the invention use can be made of hyperfiltration units entails the additional advantage that such water-soluble constituents are recycled, which in the course of ultrafiltration are introduced partly or wholly into the permeate, such as water-soluble synthetic resins, e.g. polyvinyl alcohol, special water-soluble melamine resins e.g. Cymel 327, the water-soluble proportion of organic solvents or low-molecular compounds as described, for instance, in Dietrich Saatweber's report "Untersuchungen zum Einfluβ der Ultrafiltration auf die Eigenschaften von Elektrotauchlacken", VII, FAITPEC KONGRESS, Kongress-Buch, pp 467–474. Possible changes in the mass ratios of the constituents not reaching the permeate and the constituents introduced into the permeate e.g. in case of accidental loss of ultrafiltrate, can optionally be compensated by appropriate formulation of the topping-up concentrate for the aqueous coating agents. Optionally, however, it is also possible to remove, in the manner described above, the constituents by reverse osmosis or hyperfiltration from the permeate and cause them to flow back directly into circuit B or circuit C.

BRIEF DESCRIPTION OF THE DRAWING

The attached drawing shows a flow diagram illustrating the process according to the invention and the apparatus to be used according to the invention by reference to an example, said example being a preferred embodiment of the process according to the invention.

DETAILED DESCRIPTION OF THE PREFERRED EMBODIMENTS

Figure 1:
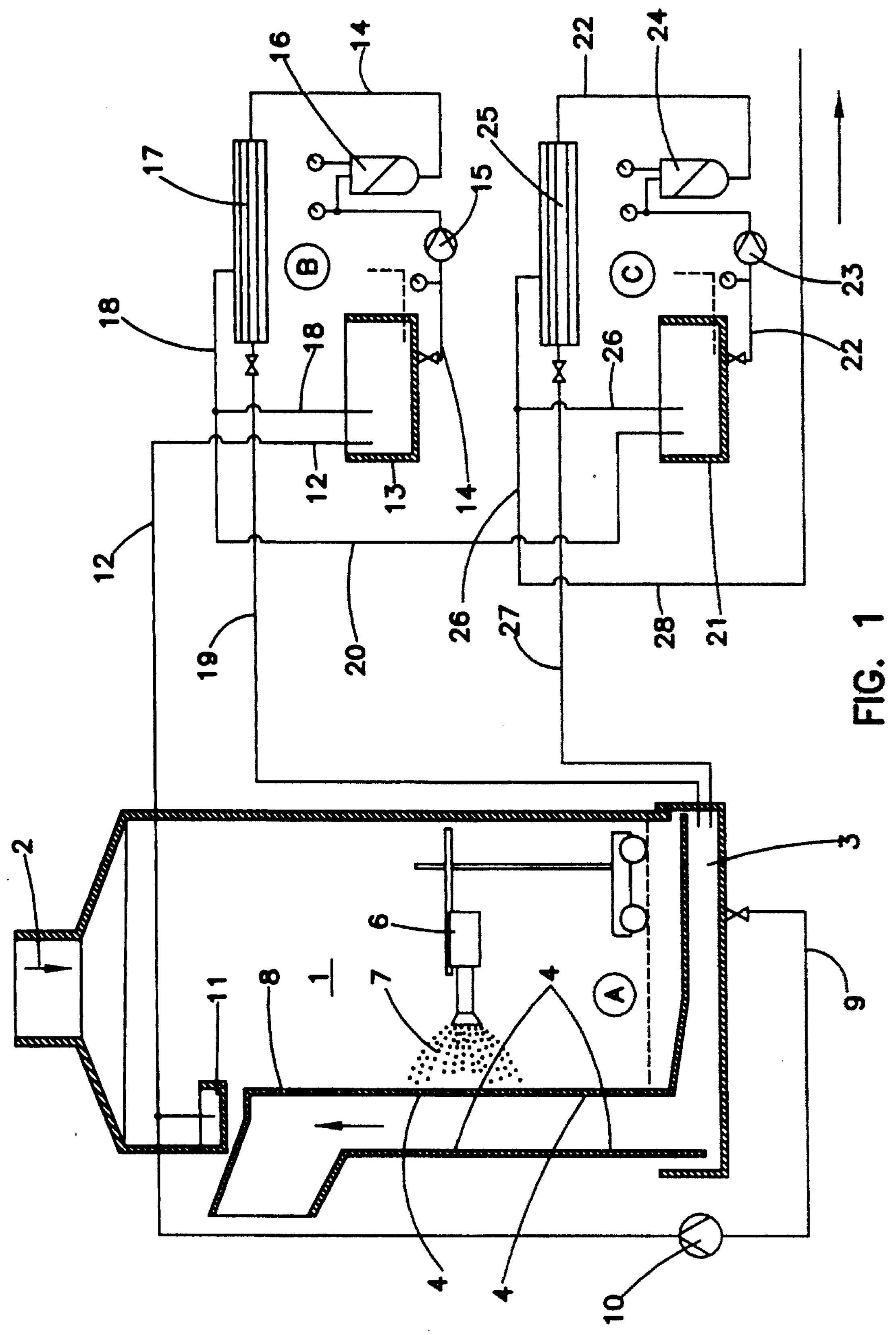

The drawing shows a conventional spray booth 1 which can be supplied with air from above through an airfeed duct 2, it being possible to channel said air at the bottom 3 of the spray booth into an exhaust duct 5 with baffles 4.

The overspray 7 (spray mist) produced when spraying with spray unit 6 is retained by wet wall 8 which is subject to sprinkling. The sprinkling liquid flowing downwards along wet wall 8 subject to sprinkling is collected in the tub-shaped bottom 3 of the spray booth and returned with the aid of a pump 10 and an overflow 11 through line 9 to the upper end of wet wall 8 subject to sprinkling.

Hence the booth circuit, circuit A, is constituted by wet wall 8 subject to sprinkling, bottom 3 of the spray booth, line 9 with pump 10 and overflow 11. By way of sprinkling liquid use is made of the permeate of circuits B and C, the solids concentration of which is maintained at an approximately constant value in the range from 1 to 1.5 wt.-%.

A line 12 branches off from line 9 in the drawing, whereby said line 12 leads e.g. via a control unit not shown, to a container 13, the purpose of which is to collect ultrafiltration retentate. Container 13 may comprise cooling devices and heating devices with a view to achieving the required operating temperatures. The overspray-enriched sprinkling liquid from line 12 is mixed with the circuit liquid in container 13.

With the aid of a pump 15 and via an optionally connectable preliminary filter 16 the ultrafiltration retentate is fed, together with the liquid from circuit A, from container 13 through line 14 to an ultrafiltration unit 17. In ultra-filtration unit 17 permeate is withdrawn continuously. The retentate is passed through line 18 back into container 13.

According to the invention an ultrafiltration circuit, circuit B, is constituted by container 13, line 14 with pump 15 and optionally connectable preliminary filter 16, ultrafiltration unit 17 and line 18. With the process according to the invention, circuit B is controlled by a control unit regulating the inflow of overspray-enriched sprinkling liquid from circuit A in such a way as to ensure that the solids concentration of the liquid circulating in circuit B is maintained at an approximately constant value ranging from 8 to 15 wt.-%.

Permeate from ultrafiltration unit 17 is drawn off through line 19 and returned to circuit A via bottom 3 of spray booth 1.

Branching off from line 18 there is a line 20 through which the circulating liquid of circuit B (retentate) can be fed into a further ultrafiltration circuit C. Line 20 can, for instance, lead via a control unit (not shown) to a container 21 for collecting ultrafiltration retentate. Container 21 may be provided with cooling units and heating units with a view to achieving the required operating temperatures. The liquid from line 20 is mixed with the circuit liquid in container 21.

With the aid of a pump 23 and via an optionally connectable preliminary filter 24, the ultrafiltration retentate is fed, together with the liquid from circuit B, via line 22 from container 21 to an ultrafiltration unit 25. In ultra-filtration unit 25 permeate is drawn off continuously. The retentate is returned through line 26 to container 14.

According to the invention, ultrafiltration circuit C is constituted by container 21, line 22 with pump 23 and optionally connectable preliminary filter 24, ultrafiltration unit 25 and line 26. With the process according to the invention circuit C is controlled in combination by a control unit regulating the inflow of retentate from circuit B, in such a manner as to maintain the solids concentration of circulating liquid C at an approximately constant value ranging between 35 wt.-% and the solids concentration corresponding to the spray viscosity of the coating agent.

Permeate from ultrafiltration unit 25 is drawn off through line 27 and returned to circuit A via bottom 3 of spray booth 1.

Ultrafiltration can be effected in such a way as to ensure that the permeate yield amounts to only a small proportion of the volume passing through the filter. As a result there is virtually no difference between the composition of the retentate and that of the circuit liquids circulating in circuits B and C, especially if the volumes of containers 13 and 21 are very large by comparison with the throughput volume of the ultrafiltration units. By taking advantage of this effect, the process according to the invention makes it possible to raise the concentration of the overspray from circuit A while the composition and the solids concentration of the liquids in circuits B and C remain virtually unchanged.

Branching off from line 26, which returns ultra-filtration retentate from ultrafiltration unit 25 to container 21, there is a connectable line 28 feeding a part of the concentrate obtained in the course of ultrafiltration to, for example, a topping-up unit. The topping-up unit is fed with topping-up concentrate which is diluted by mixing with the ultrafiltration retentate so as to produce the aqueous coating agent suitable for spray application by spray unit 6 in spray booth 1. The topping-up unit can therefore be connected with spray unit 6 by a line and optionally via a storage container. In the topping-up unit further constituents can also be mixed in which were drawn off during the process from circuits A, B or C, e.g. water or volatile constituents.

The process according to the invention can be carried out using water-dilutable coating agents such as any expert will be familiar with and which are obtainable commercially. Suitable, for example, are water-dilutable lacquers as used, for instance, for production lacquering of automobiles and motor vehicles in general. However, also water-dilutable fillers such as are used for production lacquering of automobiles are suitable.

The process according to the invention is preferably carried out using aqueous coating agents with a solids concentration between 35 and 80 wt.-%; said solids concentration is preferably equal or higher than the solids concentration of the liquid circulating in ultrafiltration circuit C.

The solids concentrations of aqueous coating and in the various circuits can be determined e.g. according to DIN 53216. As a first step, after initial weighing of the sample to be analysed, the sample is preferably preheated on a metal dish with a flat bottom for about half an hour at about 95° C. This causes a part of the water to evaporate and avoids misleading results due to splashing.

The water-dilutable coating agents, e.g. water-dilutable lacquers and fillers, may optionally contain pigments and/or fillers but can also be formulated as clear lacquers. They may contain organic solvents or be free from organic solvents.

As mentioned above, the water-dilutable coating agents suitable for use with the process according to the invention may be transparent or pigmented. They may optionally contain fillers, additives, coalescing agents, volatile organic liquids and other conventional raw materials for use in lacquers. They may be physically or chemically drying types. Both self-crosslinking or externally crosslinking systems, such as are used for stoving lacquers, are suitable.

Water-dilutable lacquers suitable for use with the process according to the invention are e.g. aqueous dispersions. They may be systems with finely dispersed polymers or synthetic resins in water based on homopolymers or copolymers of styrene, vinyl chloride, vinyl acetate, maleic anhydride, maleic ester, maleic half-ester, vinyl propionate, (meth)acrylic acid and its esters, amides and nitriles. Examples of such aqueous coating agents are listed in Dr Hans Kittel's "Lehrbuch der Lacke und Beschichtungen", vol. I, part 3, Verlag W.A. Colomb of H. Heenemann GmbH, 1974, pp 920 to 1001, and in "Lackkunstharze" by Hans Wagner and Hans Friedrich Sarx, Carl Hanser Verlag, Munich 1971, pp 207 to 242, and also in "A Manual of Resins for Surface Coatings", SITA Technology, London 1987, vol. II, pp 249 to 296.

Other examples are water-dilutable lacquers constituting emulsions of polymers or plastics. They may, for instance, contain binding agents dissolved in solvents or devoid of solvents, optionally together with cross-linking agents, said binding agents being emulsified in water. Emulsions in which the binding agent droplets are particularly finely dispersed are designated micro-emulsions. The large group of water-dilutable lacquers produced with so-called water-soluble polymers or synthetic resins and which can also be cited as examples of substances suitable for the process according to the invention comprise binding agents with acid or basic groups such as carboxylic acid groups, carboxylic anhydride groups, sulphonic acid groups, primary, secondary and tertiary amino groups, sulphonium groups, phosphonium groups. By neutralising or partly neutralising the groups with basic compounds, e.g. amine, alkanolamine, ammonia, sodium hydroxide or potassium hydroxide, or with acid compounds such as formic acid, acetic acid, lactic acid, alkyl phosphoric acid and carbonic acid, the polymers or synthetic resins are made water-dilutable. The binding-agent base consists e.g. of one or several binding agents pertaining to the group consisting of polyurethane resins, polyester resins, poly(meth)acrylate resins, epoxy resins, epoxy resin esters, aliphatic oils (e.g. linseed oil) and synthetic oils (e.g. polybutadiene oil).

Examples of so-called water-soluble lacquers are listed in

Dr. Hans Kittel's "Lehrbuch der Lacke und Beschichtungen", vol. I, part 3, Verlag W.A. Colomb of H. Heenemann GmbH, 1974, pp 879–919, and in "A Manual of Resins for Surface Coatings", SITA Technology London, 1987, vol. III, pp 169– 280, as well as in EP-A-0 032 554 and EP-A-0 309 901.

Mixtures of aqueous dispersions with so-called water-soluble polymers or synthetic resins, which are known as hybrid systems, are also suitable for the process according to the invention.

By way of cross-linking agents for the aqueous coating agents use may be made for instance of urea resins, triazine resins (such as melamine resins and benzoguanamine resins), phenolic resins, blocked polyisocyanates (such as blocked diisocyanates, triisocyanates, isocyanurates, diurets and prepolymers of isocyanates) as well as mixtures of various cross-linking agents.

The process according to the invention is preferably suitable for water-dilutable lacquers specified e.g. in DE-A-36 28 124, DE-A-36 28 125, DE-A-37 39 332, DE-A-38 05 629, DE-A-38 38 179, EP-A-0 038 127, EP-A-0 089 497, EP-A-0 123 939, EP-A-0 158 099, EP-A-0 226 171, EP-A-0 238 037, EP-A-0 234 361, EP-A-0 298 148, EP-A-0 287 144, EP-A-0 300 612, EP-A-0 315 702, EP-A-0 346 886, EP-A-0 399 427, U.S. Pat. No. 4,822,685, U.S. Pat. No. 4,794,147 and WO 87/05305 as well as in (manually, automatically or electrostatically) sprayable form for production lacquering of automobiles, and preferably for water-dilutable fillers (hydrofillers) as specified in e.g. EP-A-0 015 035, EP-A-0 269 828, EP-A-0 272 524 and WO 89/10387 as well as clear aqueous lacquers for production lacquering of automobiles as specified e.g. in EP-A-0 266 152.

The process according to the invention can preferably be applied also to water-dilutable lacquers for protection against the impact of stones as specified e.g. in DE-A-38 05 629. Such lacquers for protection against impact of stones may be applied directly to metal substrates or metal substrates primed in advance with conventional primers such as electrophoretic lacquer, and they can optionally be given a topcoat of filler. They increase the resistance of multilayer coatings to the impact of stones.

The present invention specifies a process making it possible to re-use, in a practical manner and without any problems, overspray produced during spray application of aqueous coatings agents. The process according to the invention is particularly suitable for use with manual, automatic or electrostatic spray application such as is particularly common in the sphere of automobile production lacquering. It can therefore be applied to water-dilutable lacquers for production lacquering of automobiles, such as unilacquers containing pigments and lacquers containing pigments for producing special effects such as metallic lacquers, and it is preferably applied to water-dilutable fillers (hydrofillers) as well as to water-dilutable clear lacquers for production lacquering of automobiles. It enables virtually 100% re-use of overspray in an environmentally friendly manner.

We claim:

1. A process for recovering the overspray of an aqueous coating agent during spray application in a spray booth, comprising:

collecting the overspray in an aqueous washing liquid continuously returned to the spray booth in a circuit (A), supplying continuously a part of the washing liquid containing overspray from circuit (A) to sequential ultrafiltration circuits (B) and (C), each of which produce a permeate and a retentate, and continuously drawing off the permeates from ultrafiltration circuits (B) and (C) and returning the permeates to circuit (A) in order to supplement the washing liquid, wherein;

the solids concentration of the washing liquid in circuit (A) is maintained approximately constant within a range of 1–1.5 wt.-% by combining the washing liquid with the permeates, the ultrafiltration circuit (B) contains circulating liquid b made by combining part of the retentate of circuit (B) with the part of the washing liquid supplied to circuit (B) from circuit (A), the amounts of the circuit (B) retentate and circuit (A) washing liquid being balanced so that the solids concentration of the circulating liquid b in ultrafiltration circuit (B) is maintained approximately constant within a range from 8–15 wt %, the remainder of the retentate of circuit (B) is fed from ultrafiltration circuit (B) to the ultrafiltration circuit (C), ultrafiltration circuit (C) contains circulating liquid c made by combining a part of the retentate of circuit (C) with the remainder of the retentate of circuit (B) being fed to circuit (C), the amounts of the circuit (C) retentate and remainder circuit (B) retentate being balanced so that the solids concentration of the circulating liquid c in ultrafiltration circuit (C) is maintained approximately constant within a range from 35 wt.-% to the solids concentration corresponding to that of the aqueous coating agent; and no emulsifier is added to circulating liquids b and c.

2. Process according to claim 1, wherein each of the volumes of liquid in circuit (A), circuit (B) and circuit (C) is maintained at a constant level.

3. Process according to claim 1, wherein said aqueous coating agent has a solids concentration of 35 to 80 wt.-% whereby the solids concentration is in each case equal to or higher than the solids concentration of the circulating liquid c in ultrafiltration circuit (C).

4. Process according to claim 1, wherein a part of the liquid circulating in ultrafiltration circuit (C) is mixed with fresh topping-up concentrate of the aqueous coating agent and optionally with water and/or other constituents of the coating agent, optionally with the aid of mixers so as to form the aqueous coating agent which is fed to the spray booth for spray application.

5. Process according to Claim 1 wherein the sprayable coating agent is used in ultrafiltration circuit (C) as said circulating liquid C.

6. Process according to claim 5, wherein the topping-up concentrate of the aqueous coating agent and optionally water and/or other coating agent constituents are added to ultrafiltration circuit (C) at appropriate rates to provide the selected concentrations of aqueous coating agent, water and other coating agent constituents in the sprayable coating agent, optionally with the aid of mixers, and the coating agent required for spray application is drawn from ultrafiltration circuit (C).

7. Process according to claim 6, wherein aqueous pigmented or transparent lacquers are used as components of the aqueous coating agent.

8. Process according to claim 1, wherein aqueous fillers are used as components of the aqueous coating agent.

9. Process according to claim 1, wherein an aqueous coating agent for automobile production lacquering or motor vehicle lacquering is used as the aqueous coating agent of the process.

10. A process according to claim 1 wherein at least part of the retentate ultrafiltration circuit (C) is used as at least part of the aqueous coating agent for spray application in the spray booth or for preparing said coating agent.

* * * * *

UNITED STATES PATENT AND TRADEMARK OFFICE
CERTIFICATE OF CORRECTION

PATENT NO. : 5,453,301

DATED : September 26, 1995

INVENTOR(S) : Saatweber et al.

It is certified that error appears in the above-identified patent and that said Letters Patent is hereby corrected as shown below:

In column 11, line 5, insert --from-- after the word "retentate".

Signed and Sealed this

Twenty-first Day of May, 1996

Attest:

BRUCE LEHMAN

Attesting Officer

Commissioner of Patents and Trademarks